Aug. 5, 1969   J. A. BLACK   3,459,078
SLITTING AND SCORING APPARATUS
Filed Nov. 17, 1966   2 Sheets-Sheet 1

INVENTOR.
JAMES A. BLACK
BY
ATTORNEYS

INVENTOR.
JAMES A. BLACK
BY
ATTORNEYS

United States Patent Office 3,459,078
Patented Aug. 5, 1969

3,459,078
SLITTING AND SCORING APPARATUS
James A. Black, 13700 Sparta NW.,
Kent City, Mich. 49330
Filed Nov. 17, 1966, Ser. No. 595,099
Int. Cl. B26d 3/08, 7/06
U.S. Cl. 83—8                                2 Claims

ABSTRACT OF THE DISCLOSURE

Sheet slitting and/or scoring apparatus capable of variable control depth cutting of sheets, even if not coplanar, having a cutting means biased toward the surface of a sheet to be cut, limited in cutting depth by a surface follower using the sheet surface as a reference, and adjustable between the cutting means and follower to control depth of cutting even though biased toward the sheet being cut.

---

This invention relates to sheet slitting and/or scoring apparatus, and more particularly to a slitting and scoring device capable of cutting to a controlled depth through one surface of one or more compiled sheets, whether or not such sheets have an uneven opposite surface.

This invention was devised initially for use with printed sheets or film encountered in the silk screen field because of the erratic slitting or scoring too frequently occurring on the products printed by silk screen techniques. Therefore, it will be explained largely with respect to this field. However, the resulting apparatus could be employed in other areas where similar problems might be encountered, e.g. for cutting lithographed sheets or letter press printed sheets, etc. Hence, the invention, in its broadest aspects, is not intended to be limited to this one particular field wherein it has exhibited excellent results.

In preparing products such as printed labels by the silk screen printing technique, the composite article resulting is customarily composed of the main sheet or film on one face of which is coated the deposited ink pattern, and on the opposite face of which is a layer of adhesive (see FIG. 5 of the drawings). Such articles are usually prepared in the form of an endless strip, followed by slitting or scoring of the strip at necessary places in order to form slit or score lines. Often, for example, the backing sheet is slit at intervals so that the purchaser can peel back and remove the protective backing sheet segments to enable the item to be adhered to an object.

The slitting or scoring operation conventionally is accomplished by rigidly mounting a cutting edge at a spacing of a few thousandths of an inch from a rigid support surface over which the strip passes. All too often, the slitting or scoring operation results in portions of the printed film being undesirably cut partially or completely through, as well as the backing sheet being cut. This is particularly so with silk screen materials, and particularly in the regions where the ink deposits are located. This results because of the facts that (1) the total ink thickness, especially if silk screened, is in the order of several thousandths of an inch, the backing sheet being about five to six thousandths of an inch thick, and the film being usually only about one and one-half thousandths or so inch thick; (2) the blade is at a fixed spacing from the support surface, and (3) the total laminate tends to deflect away from the blade in the regions between the ink deposits (FIG. 5). Thus, in order to obtain a complete cut of the backing sheet in these regions between the ink deposits, the blade must be adjusted to a spacing that is actually too close to the support for the cut in the ink deposit regions, so the blade then cuts into or through the film where the ink is located. This can be readily visualized by reference to the conventional blade C shown in FIG. 5 to be cutting through the backing sheet. The problem stated briefly then is that, if the blade is adjusted away from the support surface a few thousandths of an inch to accommodate the ink deposit regions, the backing sheet will not be cut clear through in the regions between the ink deposits, while if it is moved closer to the support surface to accommodate the regions between the ink deposits, the film will be cut.

Another very significant problem that is also encountered with conventional slitting and scoring cutters arises because of the difficulty in setting and maintaining the cutting edge exactly at a predetermined number of thousandths of an inch away from the support surface, which may or may not be exactly smooth.

It is an object of this invention, therefore, to provide a novel sheet slitting and scoring mechanism capable of cutting to an exact controlled depth on a sheet or sheet laminate, even a printed lithographed laminate, regardless of the thickness of projections on the sheet formed by lithography or spaced ink deposits, or of the thickness of the film, or of the thickness of the backing sheet, or even of the variations in thickness of the sheet or entire laminate from region to region.

Another object of this invention is to provide a slitting and scoring mechanism capable of cutting dependably through the thickness of a backing sheet on a printed laminate, without cutting the film upon which are spaced deposits of ink of substantial thickness.

Another object of this invention is to provide a constant depth slitting tool that can be employed manually or on a machine, and can be employed singly or in multiples.

Another object of this invention is to provide a sheet slitting and scoring mechanism that constantly cuts through a preset depth with respect to the exposed sheet surface over which it passes, even though this surface may vary in its spacing from the support surface on which the laminate is placed. In fact, the mechanism actually employs the exposed surface as its reference for the cutting depth, so that variations in the thickness of the laminate are readily accommodated.

Another object of this invention is to provide a novel combination sheet slitter or scorer and a cutting depth pre-setting jig.

These and other objects of this invention will become apparent upon studying the following specification in conjunction with the drawings in which.

Figures 1, 2, 3, 4:
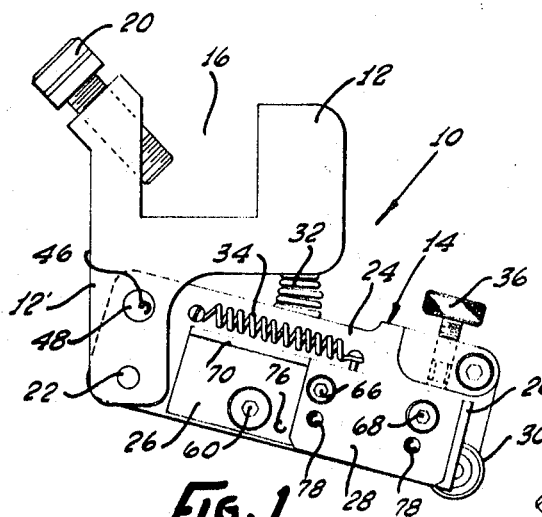
FIG. 1 is a side-elevational view of the preferred form of the novel slitting and scoring mechanism.
FIG. 2 is a side-elevational view of the mechanism in FIG. 1 shown in its normal operative position when slitting or scoring.
FIG. 3 is a front end elevational view of the mechanism in FIG. 2.
FIG. 4 is a fragmentary view of the apparatus in FIG. 2, taken on plane IV—IV.

Referring now specifically to the drawings, the complete assembly 10 includes a mount or bracket 12 upon which a surface follower and cutting means sub-assembly 14 is pivotally shaftably attached.

The mount 12 preferably is in the form of an inverted *h*, the slot 16 on its upper side fits around a conventional mounting bar 18 (FIG. 2) which normally extends transversely of the machine and mounts a plurality of slitters at selected spacings. It is secured by a set screw 20 projecting through one leg of the mount and into the slot 16 to engage a notch 18' in bar 18. The rigid mounting leg 12' depends downwardly for pivotal attachment of subassembly 14 on pivot 22.

Subassembly 14 basically includes elongated support arm 24, a pair of cooperative blade mounting elements 26 and 28, a surface riding reference wheel element 30, a compression type biasing spring 32, a tension type biasing spring 34, and a blade mount adjusting stop 36.

The generally elongated support arm 24 is pivotally mounted at one end to portion 12' of mount 12 by pivot pin 22. Thus the support arm can be pivotally shifted generally away from or toward mount 12. It is normally biased away from this mount by compression coil spring 32 maintained in position on arm 24 by a stud pin 40 and maintained in position on mount 12 by being inserted in recess 42. This spring therefore resiliently biases subsassembly 14 toward the laminate or sheet to be cut, as shown by laminate L in FIG. 2. The unit takes a normal operative position as shown in FIG. 2, with the outer end of arm 24 sloping slightly away from the mount at a small acute angle. The sloped or lowered position of the arm away from the mount is limited by contact of a fixed stop 46 attached to arm 24 with the edge of an enlarged opening 48 in mount portion 12' (FIG. 1) into which stop 46 projects. The movement of the arm toward the mount is limited by contact of this same stop 46 against the opposite side of the opening.

Attached to support 24 is the pair of plate type, abutting blade mounting elements 26 and 28. In the form of the invention illustrated, element 26 is pivotally mounted by a pin 60 to the lower portion of element 24, intermediate the ends of arm 24. Element 28 is secured fixedly to element 26 by a pair of bolts 66 and 68. A thin elongated shoulder 70 projects from element 26 toward element 28 along the upper edges of both to form a spacing between the remainder of these elements of a width approximately equal to the thickness of a blade 72 inserted therein prior to tightening of bolts 66 and 68. The blade is aligned in these holder elements by a pair of upper edge stops 78, and rear edge stop 76. The relative rotational position of the blade mounting means and blade is controlled by adjustable stop 36 and tension spring 34. Tension spring 34 is connected to support 24 by screw 82, and to blade mounting element 26 by screw 80. The spring normally biases the blade mounting element upwardly, while the adjustable stop 36 can depress the blade mounting elements and blade away from arm 24 against the bias of spring 34, into an increasingly projecting relationship from the mechanism. This controls the cutting depth in a manner to be described. Adjustable stop 36 is basically a threaded stud having a knob projecting therefrom, and having its lower end engageable with the upper edge of element 26. Threaded engagement of the bolt is obtained by extending it through a laterally projecting protrusion 24' on element 24, as seen most clearly in FIGS. 3 and 4. To assure maintenance of a pre-adjusted position, portion 24' is bifurcated (FIG. 4) with a set screw 94 projecting between the legs of the bifurcation. The blade mounting means and thus the blade can be projected from a completely recessed or retracted condition illustrated in FIG. 1, to an extended controlled depth cutting condition illustrated in FIGS. 2 and 3.

Adjacent blade 72 and the blade mounting means, at the opposite end of arm 24 from its pivotal mount 22, is a surface riding reference element 30 which is preferably a wheel rotatably mounted to the second end of arm 24 immediately adjacent and alongside of the cutting end of blade 72. Adjustment of the blade mounting means and blade thus changes the relative vertical relationship of the lower edge of the roller or wheel with respect to the cutting edge of the sloped blade.

Figure 5:
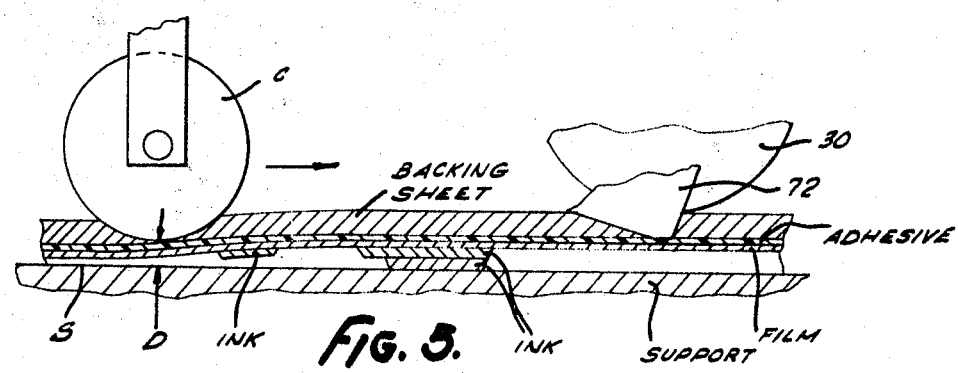
FIG. 5 is an enlarged side-elevational sectional view of a typical laminate to be scored, shown being scored by a conventional slitting and scoring blade and by the novel mechanism.

Before the novel mechanism is employed, the exact relationship between this surface following element 30 and the cutting corner of the blade is preset exactly with respect to each other. This setting can be obtained while the unit is removed from the machine on which it would normally be employed. By enabling the device to be preset independent of the machine, the usual tedious and difficult setting of the lower edge of the blade with respect to the support surface of the machine is completely eliminated. More specifically, the conventional cutter C illustrated in FIG. 5 had to be preset with respect to the support surface S by adjusting the cutter vertically so that the distance D was an exact amount. However, even with this adjustment, the final adjustment could only be made by trial and error. If the cutter was adjusted so as to just cut through the backing sheet in the regions adjacent the ink deposits, it would not cut through the backing sheet in the regions between the ink deposits because the sheets would tend to deflect as illustrated. If on the other hand it was adjusted close enough to support surface S that the backing sheet in regions between ink deposits were cut completely through, it would tend to cut through the adhesive layer and through the thin film that supports the ink deposits.

Figure 6:
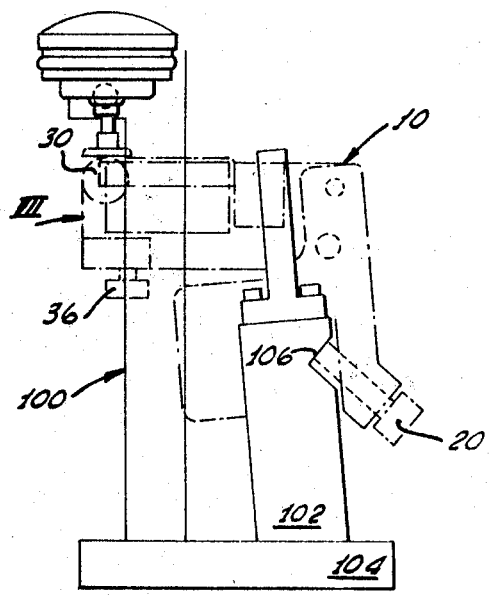
FIG. 6 is a side-elevational view of a combination of a novel blade depth setting jig and the novel slitting and scoring mechanism showing the novel slitting mechanism mounted thereon in phantom.
Figure 7:
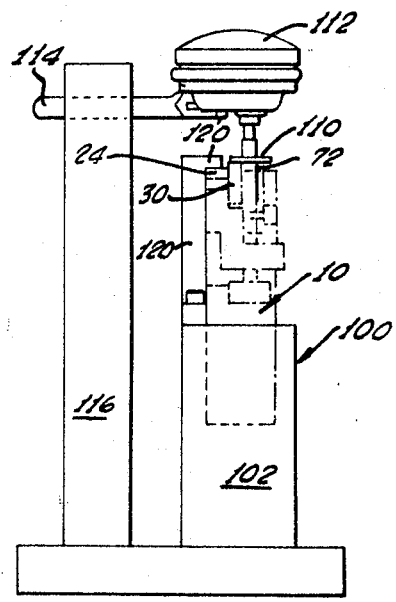
FIG. 7 is an end-elevational view of the assembly in FIG. 6.
Figure 8:
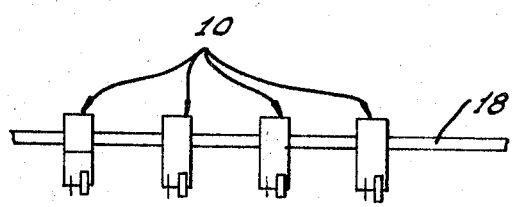

With the novel apparatus, the mechanism is preset before it is attached to mounting bar 18 so it will cut only to the depth desired, and do so uniformly. Specifically it can be preset by positioning it on jig assembly 100 shown in FIGS. 6 and 7. That is, it is attached to post 102 mounted on base 104 by screw 20 engaging in notch 106 that simulates the notch in bar 18. Flange 120' on upstanding projection 120 which is secured to post 102, overlies arm 24 to reference it. When so positioned, in an inverted relationship with respect to its normal use orientation, the roller 30 and blade edge 72 engage contact pad 110 of a conventional dial indicator 112. This dial indicator is suitably mounted on a leg 114 attached to upright support 116 of the jig assembly. With bolt 94 loose so that adjustable stop 36 can be actuated, the adjustable stop is backed off to allow spring 34 to pivot the blade mounting elements and the blade about its pivot mount so that the surface of wheel 30 engages pressure pad 110. The dial reading is then taken. Then, by adjusting the variable stop 36 upwardly to push blade 72 upwardly about its pivotal mount, it is adjusted so that it pushes pressure pad 110 until the dial indicator registers a positive reading of the desired amount. This may be about five thousandths of an inch or so if the backing sheet of this thickness is to be cut, for example. The screw 94 is tightened to hold the blade projection in this relationship. Mechanism 10 is then removed from the jig by loosening screw 20. It is normally then mounted on bar 18 on a scoring and slitting machine by tightening screw 20 into notch 18'. FIG. 8 diagrammatically shows a plurality of such assemblies mounted in a specific spaced relationship in the normal use fashion.

In employing the mechanism thus preset, it has been found that the cutting edge will only cut through the thickness of the backing sheet and will not cut into the film thickness, even though the ink deposits on the opposite side vary greatly in thickness, e.g. several thousandths of an inch. The bias of spring 32 causes reference rider 30 to continuously ride over the exposed surface of the backing sheet, to exactly control the depth of the cutting edge with regard to this reference surface.

These same operational principles apply if the unit is used as a slitter or as a scorer since slitting is cutting completely through the sheet or combination laminate while scoring is cutting partly through. The unit can also be used in letter press products or lithographed products.

The slitting apparatus is particularly useful in the field of lithography where embossments are made before the slitting operation occurs. Presently, if the sheets are slit before the embossment is applied, they tend to curl at the edges where they are slit and will not give good registration in the embossing machine. However, if they are slit after they are embossed, uncontrolled depth of slitting frequently occurs because of the projecting portions. Although the device is shown to cut sheets generally horizontally oriented, it will be understood that it can be employed in any orientation since it is independent of gravity forces.

Another important advantage of the mechanism is its capacity to be used manually by being grasped in one's hand, and still be capable of controlled depth cutting of one or more sheets. If it is to be used in this manner, mount 12 may be shaped differently, of course.

Those skilled in this art will undoubtedly see additional advantages not specifically spelled out herein. It is also conceivable that certain minor deviations in constructional details might be employed to suit particular applications or to enable the unit to be used manually. Such minor variations are intended to be within the scope of the invention which is to be limited only by the scope of the claims herein.

I claim:

1. A versatile sheet slitting mechanism capable of accommodating different sheet thicknesses and of following sheet contours, comprising: a mount; surface follower and cutting means attached to said mount in a manner to be shiftable generally toward and away therefrom; biasing means creating a biasing force of a nature to bias said surface follower and cutting means away from said mount and toward the surface of a sheet to be cut; said surface follower and cutting means including (a) a support, including a projecting, surface-containing rider portion on said support to ride on the sheet surface due to the bias of said biasing means, including (b) cutting blade mounting means on said support adjacent said rider portion, and including (c) adjustment means capable of shifting said blade mounting means with respect to said rider portion, to allow cutting depth presetting control; whereby the depth of cutting can be preset with said adjustment means, and can be maintained with respect to the sheet surface as a reference with said adjustment means and said biasing means, even if said sheet surface is not strictly co-planar; said blade mounting means being pivotally attached to said support to be movable generally toward and away from said support, wherein said adjustment means includes a biasing means mounted to bias said blade mounting means towards said support, and includes adjustable stop means to limit the movement of said blade mounting means toward said support by said biasing means.

2. The sheet cutting mechanism in claim 1 wherein said support is an elongated arm pivotally mounted on one end to said mount, said rider portion is a wheel rotationally mounted to the second end of said arm; said blade mounting means extends along said arm from said second end back toward said one end and is pivotally mounted to said arm intermedite said ends.

References Cited

UNITED STATES PATENTS

| 2,775,821 | 1/1957 | Eipper et al. | 33—185 |
| 3,165,951 | 1/1965 | Lindquist | 83—482 X |
| 3,280,676 | 10/1966 | Grzymislanwski | 83—8 |
| 3,323,221 | 6/1967 | Koch | 33—185 |

FOREIGN PATENTS 509,241 7/1939 Great Britain.

JAMES M. MEISTER, Primary Examiner

U.S. Cl. X.R.

83—433